United States Patent [19]
Janky et al.

[11] Patent Number: 5,751,245
[45] Date of Patent: May 12, 1998

[54] VEHICLE ROUTE AND SCHEDULE EXCEPTION REPORTING SYSTEM

[75] Inventors: James M. Janky, Los Altos; Eric A. Klein, Mountain View; John F. Schipper, Palo Alto, all of Calif.

[73] Assignee: Trimble Navigation Ltd., Sunnyvale, Calif.

[21] Appl. No.: 610,590

[22] Filed: Mar. 7, 1996

Related U.S. Application Data

[63] Continuation of Ser. No. 218,118, Mar. 25, 1994, abandoned.

[51] Int. Cl.$^6$ .......................... G01S 5/04; G08G 1/123; G01C 21/00; G06F 7/70
[52] U.S. Cl. .......................... 342/357; 340/993; 340/994; 364/449.1; 364/424.027; 342/457
[58] Field of Search .......................... 342/357, 457; 340/992, 993, 994; 364/424.02, 449

[56] References Cited

U.S. PATENT DOCUMENTS

| | | |
|---|---|---|
| 3,718,899 | 2/1973 | Rollins .......................... 340/993 |
| 5,068,656 | 11/1991 | Sutherland .......................... 340/989 |
| 5,541,845 | 7/1996 | Klein .......................... 364/449 |

*Primary Examiner*—Gregory C. Issing
*Attorney, Agent, or Firm*—George M. Steres

[57] ABSTRACT

A route exception reporting apparatus is mounted in a mobile shipping vehicle having a predetermined geographic route. The shipping vehicle may be a self-propelled vehicle containing cargo or may also be a separable self-contained shipping container carried on a transportation vehicle. At least a portion of the predetermined route is stored in the apparatus on board the shipping vehicle. The apparatus is provided with a geographic locating means for determining the shipping vehicle location, a comparator means for comparing the shipping vehicle location with at least one point of the predetermined route and a communication means for communicating with a central station. The apparatus is configured to communicate the shipping vehicle location to the central station when the comparator means computes a difference between the shipping vehicle location at a particular point in time and the predetermined route point corresponding with that particular time point which exceeds a predetermined limit. The central station may be provided with an alarm and display means for notifying personnel at the central station of the occurrence of a route location exception.

18 Claims, 5 Drawing Sheets

VEHICLE ROUTE AND SCHEDULE EXCEPTION REPORTING SYSTEM

This is a continuation of application Ser. No. 08/218,118 filed on Mar. 25, 1994 now abandoned.

BACKGROUND OF THE INVENTION

1. Field of the Invention

The invention relates to a location reporting system for mobile shipping vehicle in which cargo is transported and delivered. This specifically relates to shipping vehicles having a predetermined route and/or schedule in which shipping vehicles report present location, and optionally report present time, to a central station when the present location of the shipping vehicle deviates from the predetermined route or schedule by more than a predetermined amount.

2. Previous Art

Security of cargo associated with transportation has been a concern throughout history. With the increasing emphasis of wide distribution of products over broad geographic areas, it becomes ever more important to provide means to ensure the safety of items during the transportation process. Motor trucks in particular, move about one-fourth of the goods shipped in the U.S. on a ton-mile basis (1993 Almanac, Houghton Mifflin Company, Boston). Trucks and buses comprise about one sixth of all motor vehicles in the U.S. and theft statistics show over 200,000 vehicle thefts per year. The potential and actual losses due to such thefts adds appreciably to the cost of goods.

Shipping of cargo by other means such as trains and water transport is also very important. Cargo shipped by train or boat is often done by means of separable, self-contained shipping containers which are loaded onto the train or boat for transport. Such containers vary in size from 8×8×20 feet to 8×8×45 feet or even larger. These containers are generally used for consolidated shipments of similar items such as TV's.

In the discussion which follows and in the claims, the term "shipping vehicle" includes both self-propelled cargo vehicles such as trucks, and large shipping containers which are transported on trucks, trains or boats.

Measures taken to improve security and reduce the chance of loss include traditional measures, such as improved locks and containers. Modern systems using sensors and radio communications provide improved assurance for protecting cargo in transit.

One area of focus for cargo transportation security is in systems which provide location information about the shipping vehicle to a central station. One method of location and communication is disclosed in Denekamp et al. U.S. Pat. No. 4,750,197 which discloses a module mounted inside a truck trailer or container. The module includes a location detector, a clock, a signal processor and a central station communication means such as a radio. The location data may be processed to show a roadmap of the trailer route during the trip along with event data such as access door openings. One location detector disclosed is the 'ETAK NAVIGATOR' navigation system manufactured by Etak, Inc., Menlo Park, Calif. Another location detector disclosed is an on-board radio navigation system using Loran-C. The system provides for recognizing unusual events such as unscheduled container access and the like, and downloading a time and location stamped record of the events of the trip to a central station for further processing by security personnel.

A system for navigation and positioning using uncoordinated beacon signals form a multiplicity of commercial broadcast FM transmitters is disclosed by Kelley et al., U.S. Pat. No. 5,173,710. Each FM station at known fixed locations, transmits a beacon signal having a phase that is un-synchronized with the phases of the beacon signals of the other transmitters. The beacon signal is the 19 kHZ subcarrier normally used to demodulate and recover the stereo-audio channels. A fixed position observer unit, positioned at a known location, receives the beacon signals from all the transmitters in the vicinity, determines their relative phases, and broadcasts data representing these relative phases. Mobile units, at unknown locations, receive these broadcast values, as well as beacon signals from at least three radio transmitters. Each mobile unit includes phase detection circuitry that detects the phases of the beacon signals at the mobile receiver's current location. A digital phase-locked loop, coupled to the receiver, generates a phase measurement signal for each beacon signal. The phase measurement signals are then used to compute a distinct phase value for each beacon signal. A computer is used to compute the mobile unit's location from the broadcast relative phases and the detected phases.

An alternate radio navigation and tracking system is disclosed by Duffet-Smith, U.S. Pat. No. 5,045,861. A mobile unit carries one of a pair of receiving stations, the other station being at a known location. Signals are transmitted by a number of independent transmission sources, equal in number to at least the number of dimensions in which movement is to be monitored. A link passes a representation of the signal or signals received at one of the receiving stations to the other receiving station. A comparing means at the other receiving station compares the signal representations and determines the phase difference of time delay between the received signals and hence the change in phase difference or time delay of the signals as the object moves. The movement of the object relative to the transmission source or sources and hence its location can thus be determined.

In Gray et al, U.S. Pat. No. 4,651,157, there is disclosed a marine vessel location system. The system stores and retransmits Loran-C initial raw data time delays (TD's) received by an on-board Loran-C equipment to a central station. The difference between the TD's received by the vessel and the central station are used by computers in the central station to calculate the vessel location with desired accuracy. An 'anchor watch' circle is predefined, say 0.1 mile, using the initial raw TD data, around an initial fixed location at which the vessel is placed at rest. Inside of the anchor watch circle, the vessel is considered at rest. Continuous comparison of the vessel's received Loran-C TD's to the initial raw data provides a measure of movement for the vessel. If the comparison of raw data received by the vessel at an update time indicates movement beyond the 'anchor watch limit', as established by the stored initial raw data, the vessel's security system is activated to transmit an alarm to the central station. This system provides an apparatus for notifying a central station if a vesssel has moved away from a fixed point by at least a predetermined amount.

Systems using radio navigation are subject to inaccuracy in predicted precision compared to true geographic location by a number of factors. Loran-C uses the line-of-position (LOP) projection of the surface of constant time delay (TD) of two intersecting radio signals to provide navigation information. Loran-C uses relatively low frequency signals from one of a chain of three or more stations including a master and at least two secondary transmitter stations. Loran-C transmitters are generally spaced several hundred miles apart, broadcasting with power output between 200 and 1500 kW at frequencies between 90 and 110 kHz. There are about 20 chains world wide offering coverage of about 30% of the world's surface. Ten chains provide coverage of the contiguous continental U.S. The Loran-C specification offers 0.1 to 0.25 nautical miles (NM) predictable location accuracy at a fix rate of 10–20 fixed per minute over the coverage area. The inaccuracies of Loran-C are described in the *Loran-C User Handbook* COMDTPUB P16562.5, U.S. Govt. Printing Office, Washington, D.C. herein incorporated by reference. Crossing angles of the signals from transmitting stations, signal stability, noise, weather, atmospheric effects, ionic disturbances, receiver quality and sensitivity, among others, are sources of inaccuracy and are listed in Table III-1 of the *Handbook* pg. III-8. The uncertainty of location for Loran-C is expressed in terms of the probability characteristics of time delay values (TD's) from two (or more) transmitting stations observed by a receiver at a particular geographic point. The uncertainty in true location is an ellipse with a shape depending on the crossing angles and a size depending on the noise, weather, stability, etc. factors. The *Handbook* op cit.

The quantity 2 drms is a commonly used accuracy measure used to describe the geometric effects of crossing angles and gradients of Loran-C. The quantity 2 drms is the radius of a circle centered at a vehicle's apparent location such that, in at least 95 percent of the fixes, the vehicle's actual location would be located somewhere within this circle. 2 drms depends on the angles between lines connecting the vehicle and the master and secondary Loran-C stations, the correlation coefficients between measured TD's, the baseline gradient (defined in the *Handbook*, op cit) and the standard deviation of each TD. The best possible accuracy for Loran-C occurs with four station, each subtending a 90 degree angle with the adjacent station so as to form two orthogonal and uncorrelated Lines-of-Position (LOP's) (the *Handbook*, pg. G-4, op cit). The optimal accuracy for this configuration is defined as 2 drms*, where 2 drms*=$\sqrt{8}$ K $\bar{e}$=139.1 ft. where K is the baseline gradient (492.1 ft/microsec) of the Loran station and $\bar{e}$ is the common value for the standard deviation of each TD, generally taken to be 0.1 microsec (the *Handbook*, pg G-1, op cit).

The geometrical dilution of precision, (GDOP), is defined as the ratio of the actual value of 2 drms divided by this "best" value: GDOP=2 drms/2 drms*. The specified absolute accuracy of Loran-C corresponds to a GDOP of 10.92.

Dilution of precision in the horizontal plane, (HDOP) and in the vertical plane (VDOP) are usually less than GDOP.

Location effects of Geometric factors are among the most important determinants of Loran-C navigation accuracy. Geometric factors include the crossing angle and gradient of the Loran-C signals, both of which vary throughout the coverage area.

Another radio navigation system is the Global Positioning System (GPS). The GPS is part of a satellite-based navigation system developed by the United States Defense Department under its NAVSTAR program. See U.S. Pat. No. 5,319,374 filed Feb. 2, 1993 by Simon, Desai and MacKnight, James, "Precise Universal Time for Vehicles" assigned to the assignee of this invention, incorporated herein by reference. The fully operational GPS includes between 18 and 24 satellites approximately uniformly dispersed around six approximately circular orbits with up to four satellites each. The orbits are non-geosynchronous, with 0.5 sidereal day (11.97 hours) orbital time intervals, so that the satellites move with time relative to the earth below. Theoretically, as many as eight GPS satellites will be visible at one time from most points on the Earth's surface. Visual access to one or more such satellites can be used to determine an observer's location anywhere on the Earth's surface, 24 hours per day. Each satellite caries an atomic clock to provide timing information for the signals transmitted by the satellite. Internal clock correction is provided for each satellite clock.

Each GPS satellite transmits two L-band carrier signals: an L1 signal at frequency f1 of 1575.42 MHz and an L2 signal at frequency f2 of 1227.6 MHz. The signals are modulated by pseudo-random (PRN) codes unique to each satellite which are used by the GPS receiver to compute location. The L1 signal is modulated by a Precise (P) code and a Clear/Access (C/A) code in phase quadrature. The L2 signal is modulated with the P-code. Both the L1 and L2 signals are also modulated with a navigation data-bit stream at 50 bits-per-sec (bps). The navigation bit stream contains information identifying the particular satellite and additional correction data.

The functions of the codes are two-fold: 1) identification of the satellite vehicle (SV), because the code patterns for each SV are unique and are matched with like codes generated in the user receiver, and 2) measurement of the navigation signal transit time by measuring the phase shift required to match the codes. The P-code is a long precision code operating at 10.23 Mbps but difficult to acquire. The C/A code is a short code, readily acquired, but operating at 1.023 Mbps, which provides a less precise measurement of time. The C/A code is normally acquired first and a transfer is made to the P-code by use of a handover word (HOW) contained in the navigation data stream. Description of the GPS signals and operation are described in *Global Positioning System Papers*, Volume I, pp 6–11, Institute of Navigation, Washington, DC, 1980.

The geometric factors influencing the location accuracy are relative vehicle and satellite location. Other sources of error are satellite clock errors and vehicle clock errors, ephermeris errors (the description of the orbit of the satellites used for measurement), atmospheric delays, multipath errors, receiver noise and resolution and vehicle dynamics (negligible for ground transportation), doppler effects due to differing velocities, and relativistic effects due to the differing gravitational potentials of the satellites and the users. Compensation of some of the errors is achieved by transmitting correction factors from the satellite for use by a GPS receiver, *Global Positioning System Papers*, op. cit. pp 59–73.

The horizontal location error distribution obtainable by equipment using GPS is on the order of 17–30 feet (1 sigma, root-mean-square (ms)). The GDOP experienced by GPS equipment is analagous to Loran-C. Equations for the solutions for GPS GDOP and HDOP from user location and satellite location are shown in *Global Positioning System Papers* op. cit. pp. 12–14. The methods for calculating HDOP from almanac information stored in the GPS unit are well known to those skilled in the art.

The use of GPS for location reporting to a central station is well known in the art. Previous systems report present location and time for specified events, such as access door opening and the like. Previous systems also report location and time at arrival at one or more preselected locations. Reporting of shipping vehicle arrival at many preselected locations may create a significant amount of communication traffic if there are a large number of remote units and a central station.

Vehicle navigation systems using position locating means associated with route position status are disclosed in U.S.

Pat. No. 5,231,584 by Nimura et al, U.S. Pat. No. 5,262,775 by Tamai et al, and by U.S. Pat. No. 5,243,529 by Kashiwazaki. Nimura discloses a system for displaying a course guidance for a route between a departure point and a destination point from a map stored on a CD-ROM. Tamai discloses a system for displaying a message indicating a vehicle's deviation from a calculated optimal route and recomputing a new optimal route toward a destination. Navigation guidance information is displayed for the driver of the vehicle to use in following the new optimal route. Kashiwazaki discloses a system for displaying map information to aid a driver of a vehicle to reach a next schedule destination from a current location, according to a predefined schedule.

Notification by exception is a well known and accepted strategy for minimizing communication traffic between a central station and remote units. It would be an advantage to have a system to automatically notify the central station whenever a shipping vehicle deviated significantly in distance or time of arrival at selected waypoints along a predetermined route.

In cargo delivery systems using shipping vehicles having a predefined route, such as parcel delivery trucks within a city in a local environment, or city-to-city delivery trucks, it would be an advantage to have security systems which automatically notify a central station if significant deviations occur in distance or time of arrival at selected waypoints along a predetermined route.

SUMMARY OF THE INVENTION

It is an object of the invention to provide an apparatus in a shipping vehicle for automatically providing a central station with information about the shipping vehicle location, the shipping vehicle having a predetermined route and schedule.

In accordance with the above object and those that will be mentioned and will become apparent below, the security system for a mobile shipping vehicle having a defined route includes: a locating unit for defining a geographical location, Si, of the shipping vehicle; a clock unit for providing the local time, T, of the shipping vehicle at the location, Si; a communication means for communicating with the central station; a storage means for storing predetermined geographical location information about the defined route; a comparator and control unit responsive to receiving geographical location information from the locating unit at time T and comparing the received location information, Si, with the stored predetermined geographic location information, Si', corresponding with time Ti'=T. The comparator and control may include means to control the communication unit, wherein the communication unit communicates the present location and time to the central station when there is a predetermined difference between the present geographical location Si defined by the locating unit of the shipping vehicle at time Ti, and the stored predetermined location Si', corresponding to Ti.

In one embodiment of the apparatus for reporting present location to a central system in accordance with this invention, the locating unit may include a GPS navigation system that receives and interprets geographic location information from a plurality of satellites whose locations are known with high accuracy.

In an alternate embodiment of the apparatus in accordance with this invention, the locating unit may include a Loran-C navigation system that receives geographic location information from a plurality of stations whose locations are known.

Another embodiment of the apparatus in accordance with this invention may include a radio navigation system for location determination using phase difference information between signals received by the mobile unit and signals received by a receiver having a known location relative to the source of sources of the signals.

In another embodiment of the apparatus in accordance with this invention for reporting present location to a central system, the mobile communication means includes a mobile cellular telephone system. Alternatively, the communication system may be a mobile radio system.

A microprocessor and a storage memory may be used as a part of a means for comparing received location information with scheduled location, and for controlling the communication means.

The apparatus for reporting location information to a central station may report location when either 1), the difference between the present geographical location Si defined by the locating unit of the shipping vehicle at time Ti, and the stored predetermined location Si', corresponding to Ti is greater than a predetermined among, or 2) at predetermined intervals of time.

The apparatus in accordance with this invention for reporting location information to a central station, may communicate the present location to the central station when the present geographical location Si of the shipping vehicle is not in a predetermined area or corridor defined along the route.

In a city, a delivery truck or bus will move along city streets at a pace depending on traffic congestion, and may be delayed by several minutes at a time. This delay is expected and would not cause any concern. However, if a truck or bus is delayed by an excessive time from arrival at an expected location, it may be desirable to have notify someone at a central station to take notice of the delay and monitor the situation. Also, it may be important to know if a delivery truck or bus unexpectedly detoured from the predetermined streets that were expected.

This invention provides a means for monitoring shipping vehicle location and for setting an alarm or display at a central station for advising personnel to monitor or take action when the time or distance difference between expected and actual time or location exceeds a preselected threshold. The time difference or distance difference used for determining when to report location to the central station is chosen to minimize false alarms but still provide rapid response as needed.

The invention also provides for updating the shipping vehicle's predetermined route and schedule if it becomes necessary to modify the route and/or schedule in response to customer or system needs or changes in the road conditions.

In inter-city operation, the principles of use are the same, but the values used for the difference between actual time or location and stored time or location when reporting location may be selected differently.

For a system using radio navigation as the locating means, the threshold difference of distance betweeen the stored location Si' and the local location Si, may be calculated within the apparatus as a predetermined multiple of the local geometrical dilution of precision, (GDOP) as described below.

The central station of the system in accordance with the invention may include a storage means for storing an electronic representation of the predetermined route for the shipping vehicle, an alarm means for setting an alarm, and a display means for displaying the shipping vehicle location and the route.

In the event that the route or schedule must be changed while the shipping vehicle is in transit, the central station may be provided with a means for updating the route storage means in the shipping vehicle with updated predetermined route information, which replaces previously stored predetermined route information, whereby the apparatus compares present location with the updated scheduled route information. The update may be made by means of the communication equipment in the apparatus such as cellular telephone or mobile radio.

Alternate input means for updating scheduled location information to the shipping vehicle while en route, may be provided by various means, such as a keyboard, infra-red transmission and reception or magnetic card reader means.

The controller of the apparatus may be configured to accept such update only upon presentation of pre-arranged key sequences or codes which are known only to authorized personnel. This provides easy but secure methods of altering the predetermined route or schedule for a particular shipping vehicle by authorized personnel.

It is an advantage of the invention to provide an apparatus in a shipping vehicle for automatically notifying a central station with information about the shipping vehicle location, the shipping vehicle having a predetermined route and schedule.

It is also an advantage to provide shipping vehicle location information to a central station whenever the shipping vehicle deviates from the predetermined route by a significant distance.

It is another advantage to provide shipping vehicle location information whenever the shipping vehicle deviates from the predetermined schedule by a significant amount of time.

It is an additional advantage to provide a storage means in the central station for storing the predetermined route of the shipping vehicle.

It is an additional advantage to provide a means for updating predetermined route location and schedule information to the shipping vehicle in a secure, facile manner.

BRIEF DESCRIPTION OF THE DRAWINGS

For a further understanding of the objects and advantages of the present invention, reference should be had to the following detailed description, taken in conjunction with the accompanying drawings, in which like parts are given like reference numerals and wherein.

DETAILED DESCRIPTION OF A PREFERRED EMBODIMENT OF THE INVENTION

With reference to FIGS. 1A–1D, there is shown a security system for mobile shipping vehicles having a predetermined route, generally denoted by numeral 20. The system 20 includes a plurality of shipping vehicles 22a, 22b, 22c ... containing respective mobile units 24a, 24b, 24c ... mounted thereon. A predetermined geographic route and time schedule is established for each shipping vehicle by some means which is not the subject of the present invention. A graphical representation of the predetermined route and time schedule for one of the particular shipping vehicles 22 is indicated by the numeral 29.

Figure 1A:
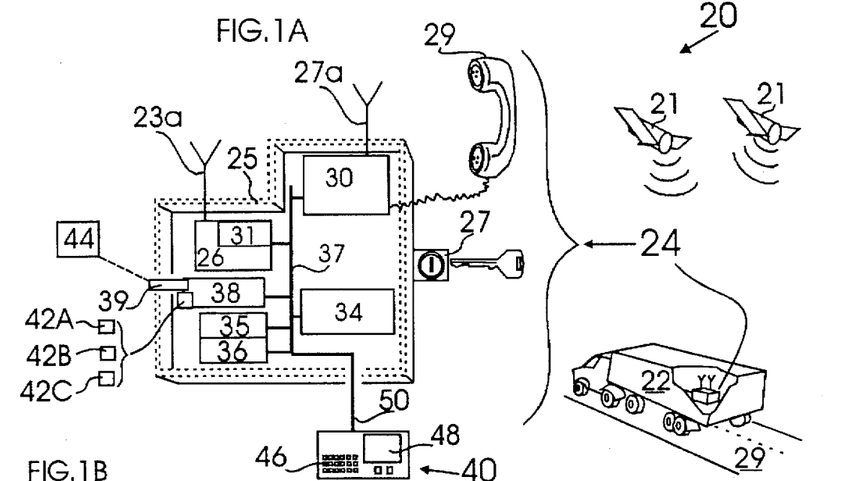
FIG. 1A is a schematic diagram showing a route exception reporting apparatus in accordance with this invention for shipping vehicles having predetermined routes.

Each mobile unit 24(a–c) includes at least a locating unit 26 (LU) for determining the geographic location Si of the shipping vehicle 22(a–c), a communication unit 30 (CMU) for communicating with a central station 32, a controller unit (CNT) 34 for controlling the locating unit 26, the communication unit 30, and other functions to be described below. Also included in the mobile unit 24 is a clock unit 31 for providing the local time to the mobile unit 24. A mobile storage (STG) unit 36 is provided within each mobile unit 24(a–c) for storing the geographic location Si' data representing the predetermined route and schedule 28 of the shipping vehicle 22. The controller unit 34 includes a comparator and control unit 35 (CMPR) for comparing geographic location data Si; as perceived by the LU 26, with the predetermined geographic location data Si' 28 stored in the storage unit 36.

In the following discussion, reference will be made to the mobile unit 24. It is to be understood that the discussion applies to any and every mobile unit 24(a–c ...) of similar configuration.

The mobile unit 24 may also include an interface unit (IU) 38, and a user interface (UA) 40. The interface unit 38 provides connection means between mobile unit 24, optional remote sensors (RS) 42 and other remote input means (RIM) 44 with the comparator and control unit 35. The user interface 40 may include a keyboard 46 and display panel 48 connected by an interface cable 50 for entering data to the mobile unit 24 and displaying data therefrom.

Figures 1B, 1C, 1D:
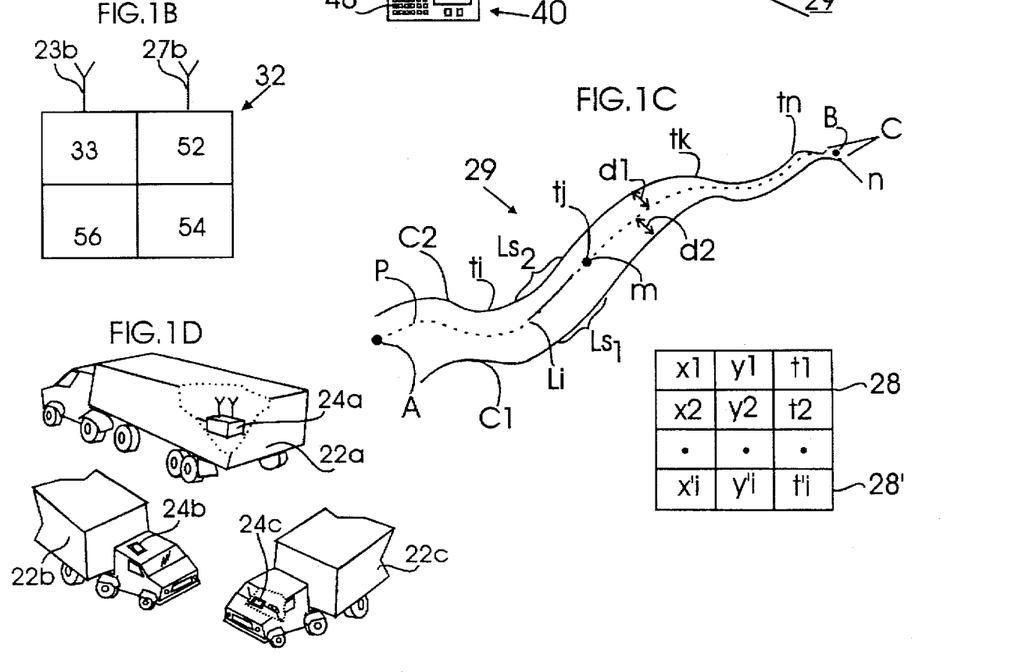
FIG. 1B is schematic diagram of a central station in accordance with this invention.
FIG. 1C is a schematic diagram of a data set 28 representing geographical route location points, xi, yi and schedule times ti.
FIG. 1D is a schematic diagram of a plurality of shipping vehicles each including a mobile unit 24 in accordance with this invention.

With reference to FIG. 1B, the central station 32 is provided with a communication device 52 for communicating with each of the mobile units 24a, 24b, 24c ... Station 32 is optionally also provided with an alarm and display unit 54 for notifying and displaying information to personnel at the central station 32.

The mobile unit 24 is enclosed in a locked, tamper proof housing 25 secured to the shipping vehicle 22 by a suitable means such as a lock and key assembly 27. The housing 25 may also be mounted securely to the shipping vehicle 22 by screws, bolts, weldment or the like.

In operation, the predetermined route and schedule information 28, represented by a set of data points Si' (where Si' is a condensed representation for the data points xi', yi') and Ti', for a particular shipping vehicle 22, is loaded in the storage unit 36, (in a manner to be described below.) The driver of shipping vehicle 22, proceeds along a predetermined geographic route 29, according to the route and time schedule established.

The control unit 34 is programmed to periodically interrogate the LU 26 for an updated location reading, Si at a time Ti corresponding to a predetermined route time Ti' according to clock unit 31. The present location Si and time Ti are stored in the storage unit 36. The comparator and control unit CMPR 35 accesses the scheduled location Si' corresponding to the predetermined time Ti'=Ti from the storage unit 36. The CMPR 35 compares the present location Si with the stored predetermined geographic location information Si'. If the present location Si and stored location Si' differ by more than a predetermined amount (to be described below), the CNT 34 causes the COM 30 to transmit the present location Si and time Ti to the central station 32.

The mobile unit 24 is also configured to transmit a Unit Identification Code (UID) uniquely identifying the unit to the communication device 52 of the central station 32. The central station 32 is provided with a signal storage device 56 for receiving and storing the transmitted location Si, time and UID data from the mobile unit 24. The storage device 56 includes a signal processor (not shown) for further processing of the received data as desired. The central station 32 is also provided with an alarm and display unit 54 for notifying station personnel of the deviation of unit 24 location Si from the predetermined route 29 and displaying it by suitable means such as a CRT.

The processing of the received data may include plotting a symbol representing the received location, Si of the mobile unit 24, on a geocoded map (not shown) and marking the UID alongside the symbol. The alarm 54 may be activated to draw the attention of personnel to the location deviation for the unit 24. The storage device 56 may include a stored copy of the data set Si' and Ti' of the predetermined route and schedule 29 of the shipping vehicle 22. A representation portion of the route 29 may be displayed for comparison with the present location Si of the mobile unit 24 by personnel in the central station 32.

The display unit 54 may include mapping displays for viewing shipping vehicle location Si in a graphic manner, such as on pre-existing digitized maps of large geographic areas. The software and systems for display and manipulation of geo-coded map information is readily available for purchase and installation by those skilled in the art and need not be discussed further here.

NAVIGATION

The LU 26 may be selected from a number of known systems, the most pertinent of which are described below.

An LU 26 for shipping vehicles using sensors for shipping vehicle speed and direction in relation to a map may be used. One such system is the "Etak Navigator" manufactured by Etak, Inc. of Menlo Park, Calif. This system employs solid state flux gate sensors to detect the direction in which the shipping vehicle is travelling. Distance and speed travelled may be derived from a mechanism connected to the vehicle's wheels. This system requires that each unit 24 contain a wide variety of stored programs corresponding to road maps of the area of travel. The wider the area, the more extensive the requirement for stored data in order to operate the system. However, for local travel, a system utilizing this method may be suitable.

A radio navigation system is another feasible option for the LU 26. One embodiment of the mobile unit 24 in accordance with this invention incorporates a Loran-C on-board radio navigation equipment as the LU 26 for obtaining and transmitting location Si of the shipping vehicle 22 during transit for systems with relatively low location accuracy requirements.

A preferred embodiment of the mobile unit 24 in accordance with this invention includes a GPS receiver/processor such as the Placer/GPS-300 made by Trimble Navigation, Sunnyvale, Calif.

Referring to FIG. 1A The GPS receivers 26 are provided with a minimum addition of hardware (signal reception and processing) to enable the required computations. The GPS receiver in the mobile unit 24 is preferably implemented using a multi-channel GPS receiver to acquire several transmissions from a corresponding plurality of GPS satellites (for example, five) simultaneously. This allows the mobile unit 24 to determine the location Si of the shipping vehicle 22 for possible transmission to the central station 32.

The central station 32 in accordance with this invention may be provided with reference GPS receiving means 33 and processing means (not shown) in addition to the mobile unit 24. This embodiment allows the use of differential GPS (DGPS) for determining shipping vehicle location Si with higher accuracy. One method for this embodiment is described in U.S. Pat. No. 5,148,179 by Allison, *Differential Position Determination using Satellites*, incorporated herein by reference.

The reference GPS receiver 33 allows for real-time correction of GPS errors. The output of the reference GPS receiver 33 effectively provides a correction factor which may be subtracted at the central station 32 from the location data Si transmitted by the shipping vehicles 22. The GPS equipment 33 in the central station 32 may be configured to provide correction factors to be transmitted to the mobile unit 24 to improve the accuracy of location measurements by the mobile GPS LU 26, thus providing the driver with the shipping vehicle 22 location Si information with greater accuracy. These differential methods provide absolute accuracies in the range of 1 to 10 meters.

COMMUNICATION

The communications unit 30 may be selected from one of a number of suitable options. One embodiment of the communication unit 30 associated with the mobile unit 24 includes a cellular telephone (CT) (not shown) controlled by the controller unit 34. Installation and connection of mobile cellular telephone equipment in a system for communicating data to a central station communication system 52 is well known by those skilled in the art.

Upon demand by the CNT 34, the COM 30 is directed to connect to a local cell of a cellular telephone service (not shown). The cellular telephone service will then connect to the public telephone system. The UID, location Si and time Ti data are then transmitted through the COM 30 and the public telephone system to the central station 32 for storage and display as described above.

A mobile radio telephone unit 19 may also be used for the communication unit 30.

PREDETERMINED ROUTE DATA INPUT

An embodiment of the remote input means (RIM) 44 for loading of the data set 28 Si, Ti representing the predetermined route 29 may be implemented in one or more of the following implementations.

One embodiment of the RIM 44 includes an IR transmitter (not shown) communicating with the mobile unit 24. The housing 25 is provided with a sensor 39 with access to the external surroundings, the sensor 39 configured for receiving an IR signal from the transmitter 44. Transmission of a coded IR bit stream from the RIM 44 to the sensor 39 enables the controller 34 to accept and transfer updated predetermined route location information Si' to the storage unit 36. This embodiment allows updating the predetermined route information 28 for a route P. The update may be done in the field, to an alternate set of predetermined route information 28', for a route P', by authorized personnel having suitably configured equipment (not shown) that contains the coded data, in the event of route changes that were made after the shipping vehicle 22 embarked on an earlier predetermined route.

Another embodiment of route data input in accordance with this invention is direct data entry through a key board 46 and display panel 48 by authorized personnel having prearranged codes for access. The keyboard 46 and display panel 48 may either be hardwired through a cable 50 or alternatively may be connected by a cable plug and jack assembly 51.

With reference to FIGS. 1A–1D and 2 another aspect of the apparatus 24 is shown. The predetermined route location information 28 for a route P may be transmitted by the central station communication device 52 to the communication unit 30 of the mobile unit 24. A coded data stream, including an updated set of Si' and Ti' of predetermined route and schedule information 28' for a route P', along with suitable coded messages, is transmitted by the communication device 52. The communication unit 30 receives the coded data stream. The coded data stream is processed by the controller 34 and stored in the storage unit 36 as the new predetermined route P' for the shipping vehicle 22 to follow. The display panel 48 is used by the controller 34 to provide updated information to the vehicle operator to follow the updated route P'. The software and systems for installation and operation of the communications and processing systems required are known by those skilled in the art.

COMPARATOR AND CONTROL

One embodiment of the comparator and control unit 35 is understood to include a microprocessor such as an X86 type by Intel Corp. along with RAM, ROM, associated data bus, address bus, control bus, program and storage memory elements as well as any incidental power, interface and buffering elements such as a UART (universal asynchronous receiver/transmitter) and a modem (not shown) for comparing the actual location data Si and predetermined location data Si' and providing signals to control the operation of the other elements of the apparatus 20, such as transmission of information to the central station 32 by the communication unit 30.

ROUTE DEFINITION AND EXCEPTION REPORTING

Figure 2:
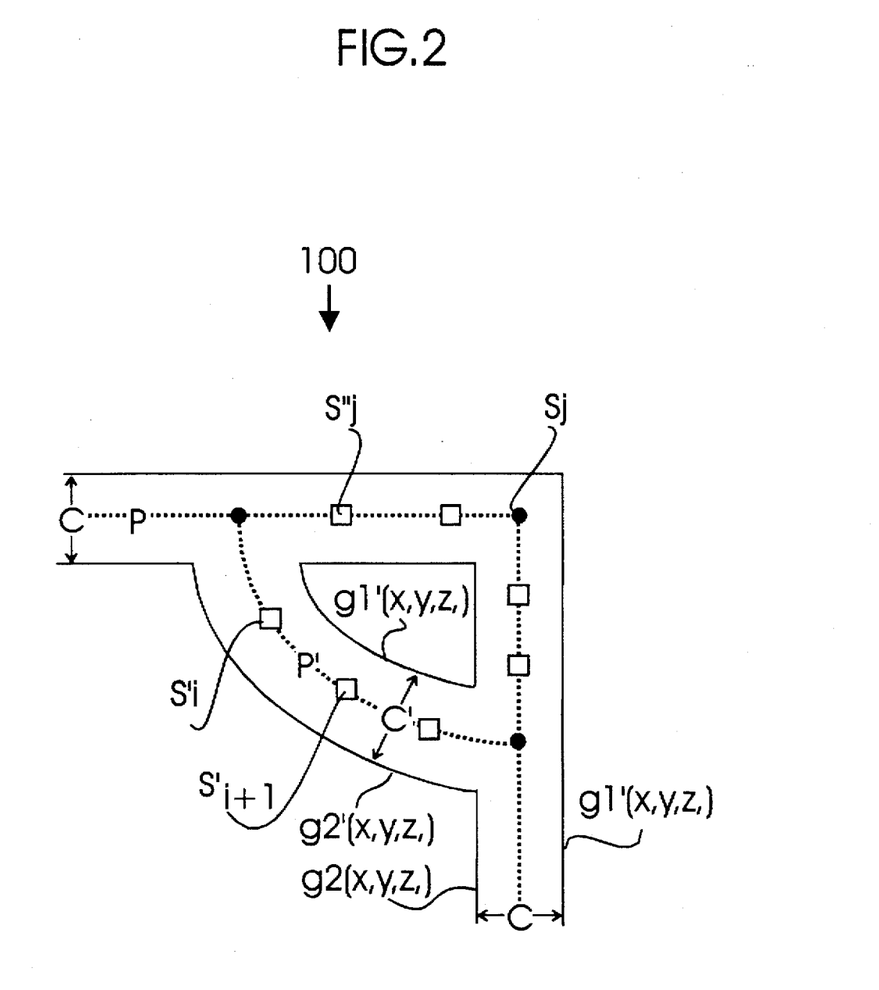
FIG. 2 is a diagram of a portion of a geo-coded map showing surveyed points and interpolated points.
Figure 4:
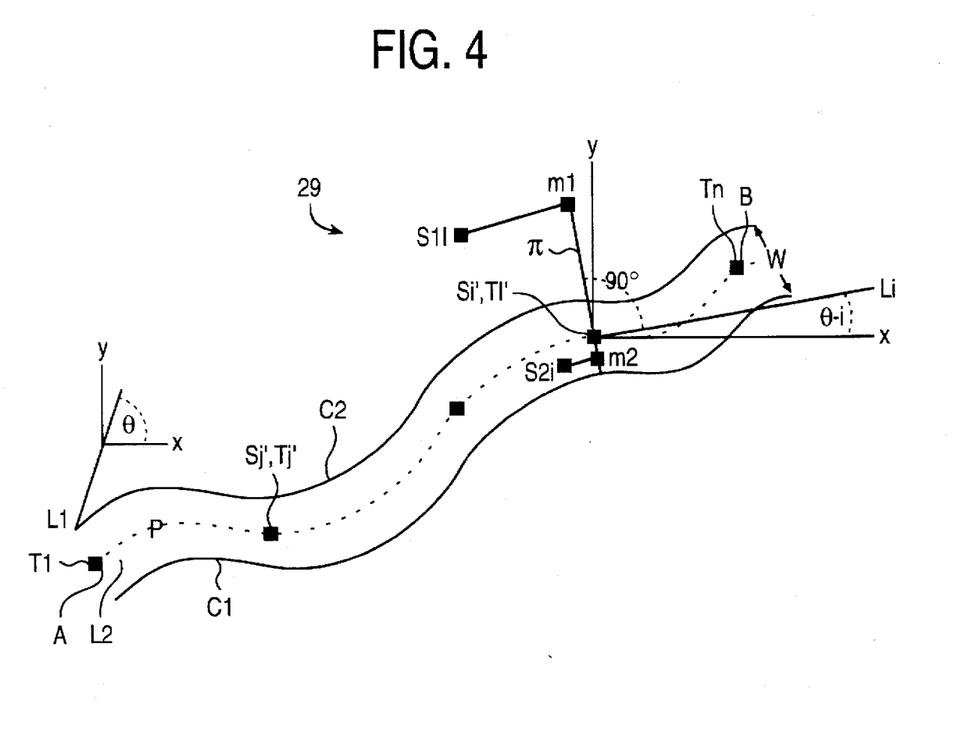
FIG. 4 is a representation of a portion of a predetermined route for a shipping vehicle.

With reference to FIG. 1C and FIG. 2, a Compliance Corridor C for a shipping vehicle, according to the invention, is a connected region of non-zero width on or near the Earth's surface within which the shipping vehicle 22 is to travel in its route from a first location A to a second location B. A nominal path P is defined within the corridor C. The path P can be defined on a two-dimensional surface S by a functional relationship $p(x,y)=0$ between two location coordinates defined on the surface S; P is thus a continuous collection of location coordinate pairs (x,y) that extends from location A to location B. Each corridor C has two associated curves, C1 and C2, that define two edges (referred to as the "right edge" and the "left edge") of the corridor. Each point on the path P always lies a positive distance $d=d1(x,y)$ or $d=d2(x,y)$ from either edge of the corridor C. Each of these curves C1 and C2 can be approximate as a collection of line segments or planes, with each line segment or plane being expressible in terms of local Cartesian coordinates x,y and z in the form $$x \cos \alpha_x + y \cos \alpha_y + z \cos \alpha_z = d = 0 \tag{1}$$

where $\cos \alpha_x$, $\cos \alpha_y$, $\cos \alpha_d$ are the direction cosines of a normal to a defining plane at a point x,y,z on the curve C(1,2) and d is the distance from the path P coordinate to its foot or perpendicular intercept on the defining line segment or plane. If the surface S is locally a planar surface (x,y plane), $\alpha_z = \pi/2$, the variable z drops out, and Ea. (1) becomes $$f(x,y) = x \cos \theta + y \sin \theta - d = 0, \tag{2}$$

where θ is the angle the line segment makes with the x-axis. With reference to FIG. 4, assume that two line segments LS1 and LS2 face each other and together define portions of the boundaries C1 and C2 of the corridor C. The portion of the corridor C that lies between two planar boundaries C1 and C2 is defined by the two simultaneous constraints.

$$f1(x,y,z) = x \cos \alpha_{x1} + y \cos \alpha_{y1} + z \cos \alpha_{z1} - d1 (a1 \leq x \leq b1) \tag{3}$$

$$f2(x,y,z) = x \cos \alpha_{x2} + y \cos \alpha_{y2} + z \cos \alpha_{z2} - d2 (a2 \leq x \leq b2) \tag{4}$$

A collection of constraints such as Eqs. (3) and (4) defines the corridor C, as indicated in FIG. 4. Again, if the surface S is planar (xy-plane), $\alpha_{z1} = \alpha_{z2} = \pi/2$, the variable z drops out and $\alpha_{yi} = \alpha_{xi} - \pi/2$ (i=1,2).

If the boundaries of the two corridor curves C1 and C2 are defined by nonlinear or non-planar constraints such as $g1(x,y,z)=0$ and $g2(x,y,z)=0$, for example, equations quadratic in x, y and/or z, the corridor C becomes a sequence of simultaneous pairs of constraints of the form $$g1(x,y,z) \leq 0 (a1 \leq x \leq b1), \tag{5}$$

$$g2(x,y,z) \leq 0 (a2 \leq x \leq b2), \tag{6}$$

If a portion of the corridor C is to be changed dynamically (i.e. on the run, as the shipping vehicle proceeds along the path P), the constraint functions $f(x,y,z)$ or $g(x,y,z)$ and the coordinate limits ai and bi (i=1,2) can be quickly replaced by new constraint functions and coordinate limits as desired. These changes might occur where a portion of the originally defined path P is no longer accessible and a detour path must be followed. A portion of the path P may become inaccessible due to construction activities, damage to the roadway or other reasons. A new portion of the path P, say P', with new constraints may be imposed to define a new portion of a corridor, say C', using equations such as (3,4) or (5,6).

Compliance of the shipping vehicle with the route constrains can be monitored as follows. At a sequence of two or more specified times {n}n, the location coordinates x=x(tn), y=y(tn) and z=z(tn) are determined using a Satellite Positioning System, such as GPS or GLONASS. For each of these sequences of times, the constraint equations (3) and (4) or (5) and (6), are applied to the present GPS-determined location. If both constraint equations are satisfied for the present location, the shipping vehicle is following the route and is in corridor compliance.

If at most one of the two constraint equations is satisfied, the shipping vehicle location is outside the compliance corridor C. The transceiver connected to the GPS receiver/ processor is then activated and caused to transmit the shipping vehicle's present location. The shipping vehicle's location at subsequent times in the sequence {tn}n, may also be transmitted to allow recording and closer monitoring of the route actually followed by the shipping vehicle. If the shipping vehicle returns to the assigned route and stays within the compliance corridor C for at least a time interval of sufficient length $\Delta t_{nr}$, so that the two constraint equations are again both satisfied, the recording and close monitoring of the shipping vehicle's present location can, optionally, be deactivated, as long as the shipping vehicle subsequently stays within the compliance corridor C. It is possible, although unlikely, that the shipping vehicle's present location can fail to satisfy both of the constraint equations, if the two planes or lines that define the corridor C boundaries are not parallel. This situation is treated in the same manner as the situation where only one constraint equation is not satisfied. Shipping vehicle location reporting and recording of corridor non-compliance is based on exception reporting, as with shipping vehicle non-compliance with a specified time schedule.

Note that route compliance, which requires that the shipping vehicle location be within the specified compliance corridor C at any time, is independent of schedule compliance, which requires that the shipping vehicle pass a sequence of check points or locations at times no later than a selected squence of schedule check times.

With reference to FIG. 1C and FIG. 2, one embodiment of the predetermined route definition and exception reporting system in accordance with this invention is now discussed.

A predetermined route may be defined in terms of geo-coded survey points Sj and interpolated points S'ji. The points Sj, may be obtained from a commercial geo-coded data base indicated generally as numeral 100. Suitable geo-coded data bases are available from Etak, Corp. Menlo Park, Calif. Thomas Bros. San Francisco, Calif. or Navigation Technologies of Sunnyvale, Calif. Interpolated points S"j, may be computed by suitable means known in the art to provide segments Lj', of the route 29 to be followed.

Path segments Li' are chosen to represent the actual route P to the desired accuracy. The segments Li' are stored as pairs of points Si', Si'+1 in the central storage device 56. An expected time of arrival Ti' is associated with each point Si' and similarly stored in device 56.

A duplicate copy of stored Si', Ti' points is stored in the mobile unit 24 storage unit 36 by one of the means described above.

During the time interval that the shipping vehicle 22 moves along the predetermined path 29, the location of the shipping vehicle 22 is obtained at a time Ti' as described above. The comparator and control unit 35 calculates the difference, Dp, between the actual location Si corresponding to time Ti=Ti' and the predetermined point Si' corresponding to Ti'. The comparator and control unit 35 also computes the current HDOP value at time Ti, using the location Si of the shipping vehicle 22 and the stored almanac information corresponding to the ephermeris data regarding the satellites used for the location measurement. A predetermined multiplier, N, is applied to the calculated HDOP×2 drms*. If the difference Dp exceeds N×HDOP×2 drms*, the shipping vehicle is judged to be off the predetermined route 29. The controller 34, commands the communication unit 30 to connect to the central station 52. The current location Si, and time Ti, along with the mobile unit UID is transmitted to the central station.

The multiplier N is chosen to give a suitably low false error rate, while ensuring that significant deviations of the shipping vehicle 22 from the predetermined route 28 are transmitted to the central station 52.

The utilization of the HDOP as a measure of allowable route deviation is optimum in the sense that it is the best estimate of the minimum likely deviation from the predetermined path which can be obtained from the GPS system. This has the advantage that the false alarm rate and the allowable route deviations are minimized along all points Si of the route 29.

If deviations of very small magnitude, i.e. on the order of 10 meters or less, must be detected, then use of a differential GPS (DGPS) system may be advisable.

The comparator and control unit 35 is also configured to monitor the time reported by the clock unit 31. At predetermined time intervals, Tl, the comparator and control unit 35 obtains the current time Ti, from the clock unit 31 and the present location Si from the LU 26. The comparator and control unit 35 then commands the communication unit 30 to transmit the UID, Ti and Si information to the central station 32. This information is appended to a log file (not shown) and stored in the central station storage device 56 as a trip log for the shipping vehicle 22. The appended log file may be processed at a later time as desired. The software and systems required for transfer and storage of the information are well known by those skilled in the art.

Figure 3:
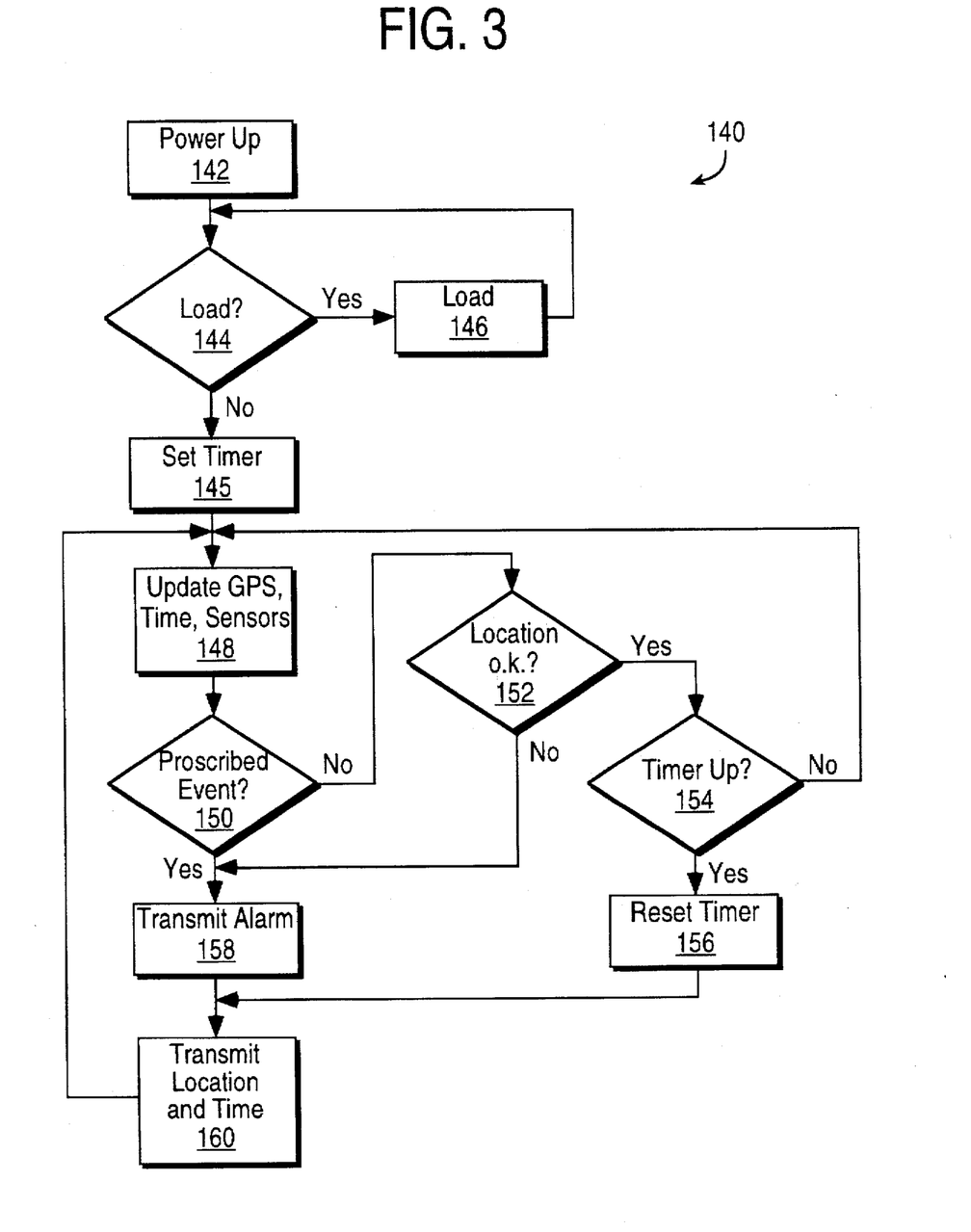
FIG. 3 is a flow chart of the operation of one embodiment of the shipping vehicle location exception reporting apparatus in accordance with this invention.

The structure of the route exception reporting unit 20 having been described with reference to FIGS. 1A–1D and 2, the following is a description of the operation with reference to FIG. 3, showing a flow chart generally indicated by the numeral 140. On power up at step 142, the mobile unit 24 is ready to accept input data. Control passes to a block 144, whereupon the unit 24 receives the input data from the RIM 44, keyboard 46 or communication unit 30. Predetermined route and schedule information represented as a set of points Si and time values Ti, and control messages are received and stored in the storage unit 36 under command of the comparator and control unit 35 at a block 146. The control messages may include limit values for reporting route and time exceptions, for example, a multiplier value N to be used in route location exception reporting and a time limit value, Tl, to be used schedule exception reporting. The unit 35 is also configured to accept and store control messages from other relevant input units such as the RIM 44. Data are transferred and stored through the loop including the block 144 and the block 146 until the decision block 144 passes control to a block 145. The block 145 causes the current time, Ti, from the clock unit 31 to be stored as a value, Ts, in the storage unit 36. Control then passes to a block 148.

At the block 148 the GPS LU 26 is interrogated for current location information Si, the clock unit 31 is interrogated for current time Ti, and the interface unit 38 is scanned for active outputs from remote sensors 42. The comparator and control unit 35 also computes a current value of N×HDOP×2 drms* based on the geographic location data Si, the time Ti, and the almanac information stored in the GPS LU 26. A decision block 150 tests for the presence of active sensors 42 as indicated by the interface unit 38 indicating a proscribed event. Upon receipt of an active sensor output, control is passed to a block 158 which causes an alarm message to be sent by the communication unit 30 to the central station 32. The particular sensor 42 activated may also be identified and included in the alarm message.

Control then passes to a block 160 which directs the communication unit 30 to transmit the UID, current location Si and time Ti to the central station 32. The block 160 then passes control back to the block 148 for new updates of the GPS location data, time, and sensor 42 activity. UID, alarm and location information will continue to be transmitted until the event causing the sensor activation is cleared.

In the event that no active sensor 42 output signals are processed by the interface unit 38, the decision block 150 will transfer control to a decision block 152. At the block 152, the comparator and control unit 35 makes a comparison between the present location Si and the predetermined value Si' corresponding to time Ti=Ti' stored in the storage unit 36.

In the event the difference Dp=|si−Si'| exceeds the computed limit N×HCOP×2 drms*, stored in the storage unit 36, control is passed to the block 158. The block 158 causes an alarm message to be sent by the communication unit 30 to the central station 32. Control passes to the block 160 in which the UID, location data Si, and current time Ti, of the shipping vehicle 22 will also be transmitted.

The block 160 passes control to the block 148 for new updates of location by the GPS unit 26, time from the clock unit 31, and new evaluation of sensor outputs 42. A loop passing through the blocks 148, 150, 158 and 160 will be established as long as one or both of the conditions of sensor 42 activation or |Si−si'|>Dp are true. If |Si−Si'|>Dp is true the loop will pass through the block 152.

If the sensor 42 is not activated and |Si−Si'|≦Dp, then control will pass from the block 152 to the block 154. At the block 154 the clock unit 31 will be interrogated for the current time Ti. The comparator and control unit 35 will test whether the elapsed time Ti−Ts since the last transmission to the central station exceeds the predetermined time limit, Tl. If Ti−Ts<TL, control will be returned to the block 148 for updates of location, time and sensor activity. If Ti−Ts>/=TL, control will pass to a block 156. At block 156 the current time Ti is stored as a new value for Ts in storage unit 36. Control then passes to the block 160 in which the communication unit 30 transmits UID, present location Si and time Ti to the central station 32.

Control is then returned to the block 148 in which the comparator and control unit 35 causes updates of GPS location Si, time Ti and sensor 42 activity to be entered.

The flow chart 140 may be implemented as a software program stored in the comparator and control unit 35, or as hardwired logic using NAND, NOR and INVERT logic and the like, in the exception reporting unit 20. The implementation may also be split, with some functions in hardware and some in software. The implementation is not intended to limit the scope of this invention.

The particular flow chart 140 shown, is not intended to limit the scope of this invention. The presence of various blocks, their location and relation may be arranged differently and still meet the scope and intent of this invention.

With reference to FIG. 4, an alternate embodiment of the apparatus 24 in accordance with this invention, may include the definition of a corridor C of fixed path width, W, surrounding the predetermined route P.

At a time Ti' corresponding to one of the data points Si', in the data set representing the predetermined route information 28, the location of the shipping vehicle 22 is obtained from the LU 26 as before. The segment Li is used as the tangent to the route P at the point Si' corresponding to the time Ti=Ti'. The comparator and control unit 35 is configured to compute the projection Π of the vector S1i-si' along a perpendicular to the segment Li. If the projection Π is outside the width W at a point m1, the shipping vehicle 22 is judged to be outside the allowed corridor 120. The controller 34 will cause the communication unit 30 to transmit the location, time and UID to the central station communication device 52 as before. If the projection Π is at a point m2 inside the width W, the mobile unit 24 will not transmit.

This embodiment has the advantage that fewer computations are required by the comparator and control unit 35.

AN ALTERNATE EMBODIMENT

Figure 5:
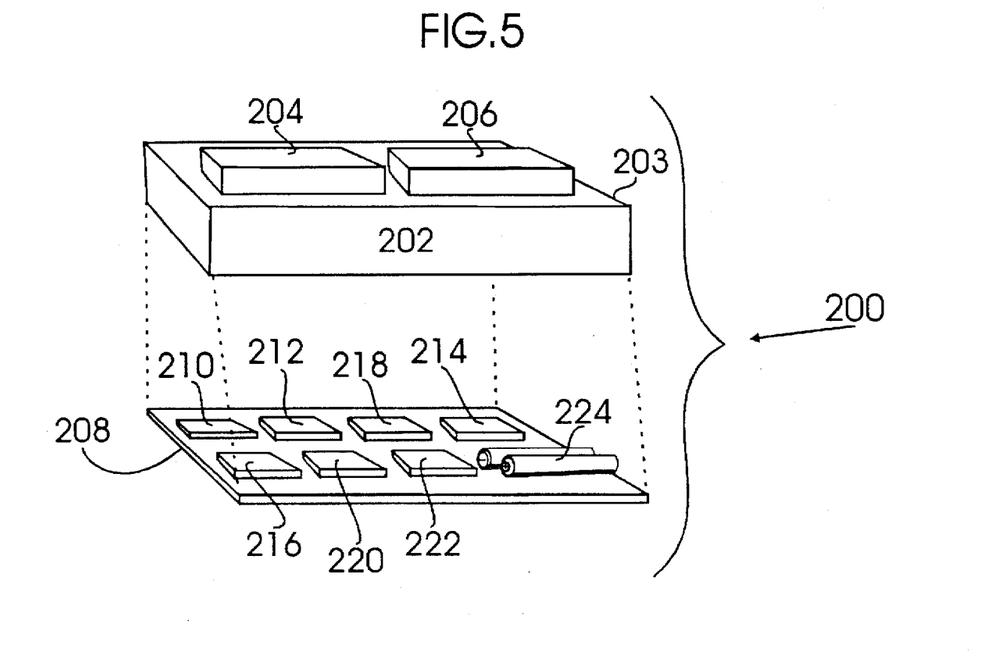
FIG. 5 is a diagram of a self-contained mobile shipping vehicle route exception reporting unit in accordance with this invention.

The physical implementation of this invention may take different forms in terms of size and packaging. With reference to FIG. 5, a small, self-contained embodiment of the route exception reporting apparatus in accordance with this invention is indicated generally by numeral 200. An enclosure 202 has an upper surface 203 provided with a GPS patch antenna 204 and a cellular phone antenna 206. The patch antenna is typically about 1½×1½ inches to 4×4 inches wide by ¼ to ½ inches thick. The patch antenna dimensions are related to the dielectric constant of the material on which it is fabricated. The cellular phone antenna is a loop antenna and has a diameter of between about 3 and 4 inches and a thickness of about 0.75 mm. One or more circuit boards 208 are installed within the weather proof enclosure 202. Miniaturized versions of a GPS transmitter/receiver 210, a cell phone card 212, a modem 214, a micro-controller 216, an internal clock 218, a memory system 220, an interface unit 222 and a power source 224 are mounted and connected on the board 208 using known printed circuit board techniques such as surface mount or through hole mounting. Provision for remote data input may be made as before by receiving data transmitted from the central station 32.

The enclosure 202 may be mounted in an inconspicuous place on a shipping vehicle 22b such as the top of a truck cab, indicated by 24b in FIG. 1. The apparatus 200 would be generally out of sight and thereby unnoticed by persons who might pose a threat to the shipping vehicle 22b and the cargo therein. It even could be disguised to be unapparent to the driver of the shipping vehicle 22b by mounting the unit 200 such that the upper surface 203 is flush with the top of the cab of the shipping vehicle 22b as indicated on unit 24b of FIG. 1. The unit 200 may be disguised with a covering panel of RF transparent material colored to resemble the shipping vehicle 22b.

Figure 6:
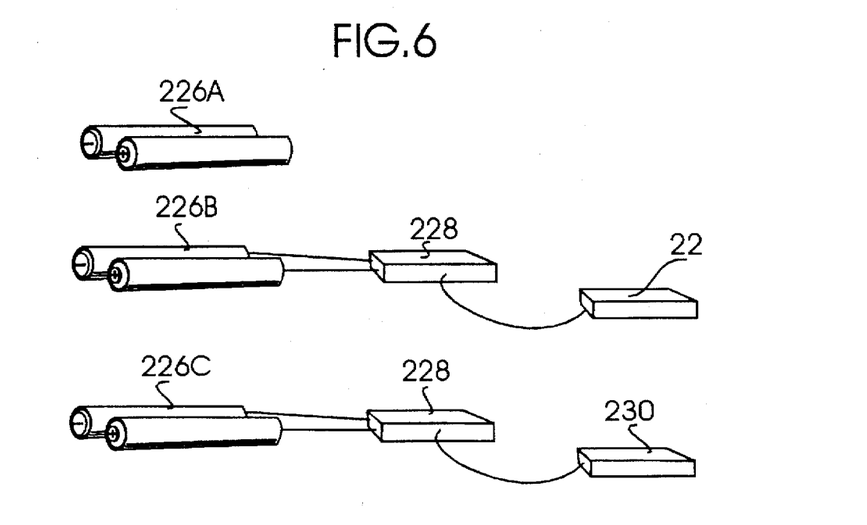
FIG. 6 is a diagram showing optional power sources for the unit of FIG. 5.

The power source 224 may be one of several types of self-contained power supplies. FIG. 5 indicates three optional self-contained power sources contemplated for this embodiment of the invention. A set of replaceable batteries 226 would enable complete separation of the operation of the apparatus 200 from the operation of the shipping vehicle 22. A set of rechargeable batteries 226 and a charger 228 connected to the shipping vehicle 22 power system would enable semi-independent operation with an additional cost of installation. A set of rechargeable batteries 226 connected to a charger 228 and solar cell 230 would allow complete independence from the shipping vehicle 22 system. The top surface 203 of the enclosure 202 would have to be modified to accept the solar cell 230 or the solar cell 230 would have to be mounted independently from the enclosure 202 at the cost of a slightly more visible system.

In operation, as before, the predetermined route and schedule information represented by a set 28 of data points Si' and Ti', for a particular shipping vehicle 22 is loaded in the storage unit 220. The driver of shipping vehicle 22, proceeds on the predetermined geographic route 29, according to the time schedule established.

The control unit 216 is programmed to periodically interrogate the GPS 210 for an updated location reading, Si at a time Ti corresponding to a predetermined route time Ti' according to clock unit 218. The present location Si and time Ti are stored in the storage unit 220. The controller 216 accesses the location Si' corresponding to the predetermined time Ti'-32 Ti from the storage unit 220. The controller 216 compares the present location Si with the stored predetermined geographical location information Si'. If either the present location Si and stored location Si' differ by more than a predetermined amount (to be described below), the controller 216 enables the modem 214 and cell phone 212 to transmit the present location Si and time Ti to the central station 32.

The mobile unit 200 is also configured to transmit a Unit Identification Code (UIS) uniquely identifying the unit to the communication device 52 of the central station 32. The central station 32 is provided with a storage device 56 for receiving and storing the transmitted location, time and UID data from the mobile unit 24. The storage device 56 includes a processor (not shown) for further processing of the received data as desired. The central station 32 is also provided with an alarm and display unit 54 for notifying station personnel of the deviation of the unit 200 location from the predetermined route and displaying it by suitable means such as a CRT. The alarm and display operations may be implemented as before described.

While the foregoing detailed description has described several embodiments of the route exception reporting apparatus in accordance with this invention, it is to be understood that the above description is illustrative only and not limiting of the disclosed invention. The application of this invention is not restricted to mobile land vehicles. It is contemplated that an embodiment of the invention may be used in a marine or aeronautical transportation shipping vehicle. It could also be affixed to containers used in containerized shipping.

Particularly, the specific implementations of the controller, locating unit, the communication unit, the clock unit, the central station alarm and display, the comparator and control and storage units, the size and shape of the enclosures and the specific algorithms used to calculate the values of distance and time difference may vary from those shown and discussed so long as the actual mobile unit location as determined by a locating unit on the shipping vehicle is compared with the stored, predetermined route stored on board the shipping vehicle and is reported to a central station when the difference exceeds a specified amount. Thus the invention is to be limited only by the claims as set forth.

We claim:

1. In a security system for a mobile vehicle having a defined route and schedule, an apparatus carried on the vehicle for reporting location information to a central station, the apparatus comprising:

locating means for determining a geographical location, Si, of the mobile vehicle;

clock means for providing the local time, Ti, of the mobile vehicle at the location, Si;

storage means for storing a set of predetermined geographical locations Si', and a corresponding set of predetermined schedule times, Ti', along the defined route;

comparator and control means responsive to the locating means for receiving vehicle geographical location Si, from the locating means at time Ti;

means for computing a threshold difference of distance which is a predetermined function of the vehicle's present location, Si;

means for computing the distance, Dp, between the location of the vehicle, Si, and predetermined location, Si' corresponding to time Ti'=Ti;

means for comparing the distance, Dp, to the threshold difference of distance;

communication means for communicating the present location, Si, and time, Ti, to the central station when the distance, Dp, exceeds the threshold difference of distance.

2. An apparatus as set forth in claim 1, in which the threshold difference of distance is computed as a function of the HDOP at the vehicle location.

3. An apparatus as set forth in claim 2 in which the threshold difference of distance includes HDOP times 2 drms*.

4. An apparatus as set forth in claim 3 in which the threshold difference of distance is a multiple of HDOP times 2 drms*.

5. An apparatus for reporting present location Si to a central system as set forth in claim 1, wherein said locating means includes a GPS navigation system.

6. An apparatus for reporting present vehicle location Si to a central system as set forth in claim 1, wherein said locating means includes a Loran-C navigation system.

7. An apparatus for reporting present vehicle location Si to a central system as set forth in claim 1, wherein said mobile communication means includes a mobile cellular telephone system.

8. An apparatus for reporting present vehicle location Si to a central system as set forth in 1, wherein said mobile communication means includes a mobile radio system.

9. An apparatus for reporting present vehicle location Si to a central system as set forth in 1, wherein said comparator and control means includes a microprocessor and a storage memory.

10. In a security system for a mobile vehicle having a defined route and schedule as set forth in claim 9, wherein the storage means has means for receiving and storing predetermined location and schedule information from the central station, while the mobile vehicle is in transit along the defined route.

11. In a security system as set forth in claim 9, wherein:
the apparatus includes an input terminal for receiving updated predetermined location information, the input terminal being connected to the storage means for storing the updated information while the mobile vehicle is in transit along the defined route.

12. In a security system as set forth in claim 1, wherein:
the communication means is responsive to the control means for communicating the present location Si and time Ti to the central station at a predetermined time.

13. In a security system as set forth in claim 1, wherein the central station includes:

storage means for storing an electronic representation of the defined route for the mobile vehicle;

communication means for receiving location information Si from the mobile vehicle;

alarm means responsive to the communications means for setting an alarm to notify personnel when the location information, Si, has been received;

display means for retrieving the stored representation of the defined route from the storage means, the display means including means for receiving the mobile vehicle location information Si, the display means including means for displaying the mobile vehicle location information Si and the defined route.

14. In a security system as set forth in claim 13, wherein:
the input terminal for receiving updated predetermined location information is selected from the group consisting of a keyboard, an infra-red transmitter/receiver, and a magnetic card reader, the input terminal being connected to the storage means for storing the updated information, while the mobile vehicle is in transit along the defined route.

15. In a security system as set forth in claim 1, wherein:

the communication means is responsive to receiving updated predetermined geographic location information Si' an updated schedule information Ti' for defining an updated defined route and schedule to be followed by the mobile vehicle;

storage means responsive to the communication means for receiving and storing the updated predetermined geographic location information Si' and the updated schedule information Ti' for an updated defined route to be followed by the mobile vehicle.

16. In a security system as set forth in claim 1, wherein the threshold difference of distance is calculated as a multiple, N, of an error limit selected from the group consisting of a predetermined error boundary, the HDOP computed at the location Si, and the GDOP calculated at the location Si.

17. In a security system as set forth in claim 16, wherein the multiple, N, is selected to minimize the probability of false error reporting.

18. In a security system as set forth in claim 16, wherein the multiple, N, is selected to maximize rapid response.

* * * * *

UNITED STATES PATENT AND TRADEMARK OFFICE
CERTIFICATE OF CORRECTION

PATENT NO. : 5,751,245  
DATED : 5/12/98  
INVENTOR(S) : Janky et al.

It is certified that error appears in the above-identified patent and that said Letters Patent is hereby corrected as shown below:

In column 6 at line 34 delete "have"

In column 8 at line 4 insert --226A, B, C-- after "sources for"

In column 8 at line 30 delete "28" and insert --29--

In column 10 at line 2 insert --26-- after "receiver/processor"

In column 10 at line 10 insert --21-- after "satellites"

In column 10 at line 11 delete "simultaneously." and insert --simultaneously, through the GPS signal antenna 23A.--

In column 10 at line 13 insert --through first communication antenna 27A and second communication antenna 27B-- after "32"

In column 10 at line 15 insert --having second GPS signal antenna 23 B-- after "33"

In column 11 at line 4 delete "28" and insert --29--

In column 11 at line 20 delete "28" and insert --29--

In column 11 at line 41 insert --37-- after "control bus"

In column 12 at line 19 delete "FIG. 4" and insert --FIG. 1 C--

UNITED STATES PATENT AND TRADEMARK OFFICE
CERTIFICATE OF CORRECTION

PATENT NO. : 5,751,245
DATED : 5/12/98
INVENTOR(S) : Janky et al.

It is certified that error appears in the above-identified patent and that said Letters Patent is hereby corrected as shown below:

In column 13 at line 32 delete "S'ji" and insert --S"j--

In column 13 at line 39 delete "Lj'" and insert --Li'--

In column 14 at line 1 delete "28" and insert --29--

In column 14 at line 41 insert --in-- between "used" and "schedule"

In column 15 at line 58 delete "28" and insert --29--

In column 16 at line 44 delete "FIG. 5" and insert --FIG. 6--

In column 17 at line 6 delete "either"

Signed and Sealed this

Twenty-second Day of May, 2001

Attest:

NICHOLAS P. GODICI

Attesting Officer

Acting Director of the United States Patent and Trademark Office